United States Patent
An (10) Patent No.: US 11,794,817 B2
(45) Date of Patent: Oct. 24, 2023

(54) SIDE SILL FOR MOUNTING SLIDING DOOR OF VEHICLE

(71) Applicants: Hyundai Motor Company, Seoul (KR); Kia Corporation, Seoul (KR)

(72) Inventor: Kwang Hee An, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 106 days.

(21) Appl. No.: 17/409,240

(22) Filed: Aug. 23, 2021

(65) Prior Publication Data

US 2022/0185380 A1 Jun. 16, 2022

(30) Foreign Application Priority Data

Dec. 15, 2020 (KR) .................. 10-2020-0174952

(51) Int. Cl.
  *B62D 25/02* (2006.01)
  *B60J 5/06* (2006.01)
  *B60K 1/04* (2019.01)
  *B62D 25/20* (2006.01)

(52) U.S. Cl.
  CPC .............. *B62D 25/025* (2013.01); *B60J 5/06* (2013.01); *B60K 1/04* (2013.01); *B60K 2001/0438* (2013.01); *B62D 25/2036* (2013.01)

(58) Field of Classification Search
  CPC ....... B62D 25/025; B62D 25/2036; B60J 5/06
  USPC ................................................. 296/209, 155
  See application file for complete search history.

(56) References Cited

U.S. PATENT DOCUMENTS

| | | | |
|---|---|---|---|
| 4,582,357 A * | 4/1986 | Nakamura ................. | B60J 5/06 49/213 |
| 7,654,352 B2 * | 2/2010 | Takasaki ............. | H01M 50/278 180/68.5 |
| RE44,994 E | 7/2014 | Rawlinson et al. | |
| 8,939,246 B2 * | 1/2015 | Yamaguchi ............. | B60L 50/66 180/311 |
| 8,960,781 B2 * | 2/2015 | Rawlinson ............. | B62D 25/02 180/68.5 |
| 10,023,038 B2 | 7/2018 | Rawlinson et al. | |
| 10,603,998 B2 * | 3/2020 | Toyota .................... | B60L 50/66 |
| 10,995,531 B2 * | 5/2021 | Rodermund ........ | E05D 15/0656 |
| 2018/0334022 A1 | 11/2018 | Rawlinson et al. | |

* cited by examiner

*Primary Examiner* — Dennis H Pedder
(74) *Attorney, Agent, or Firm* — Fox Rothschild LLP (57) ABSTRACT

A side sill for mounting a sliding door of a vehicle may support operations of opening and closing the sliding door without reducing an area of a space inside the vehicle. The side sill includes an inner panel that extends in forward and rearward directions and which is mounted at a side portion of a floor panel of a vehicle body, and an outer panel formed integrally with an upper end and a lower end of the inner panel so as to be disposed opposite the floor panel of the vehicle body based on the inner panel, the outer panel having a module mounting part for mounting a sliding module for the sliding door based on upward and downward directions, the module mounting part being open towards an outside of the vehicle body.

15 Claims, 5 Drawing Sheets

SIDE SILL FOR MOUNTING SLIDING DOOR OF VEHICLE

CROSS-REFERENCE TO RELATED APPLICATION

This application claims under 35 U.S.C. § 119(a) the benefit of Korean Patent Application No. 10-2020-0174952 filed on Dec. 15, 2020, the entire contents of which are incorporated herein by reference.

BACKGROUND

(a) Technical Field

The present disclosure relates to a side sill for mounting a sliding door of a vehicle, more particularly, to the side sill on which a sliding module configured to open and close the sliding door may be mounted.

(b) Description of the Related Art

In general, a side sill is a member which is disposed at a lower portion of a door of a vehicle so as to be oriented in forward and rearward directions, and may be connected to a floor panel forming a bottom of a vehicle body.

In a vehicle on which a sliding door is mounted, a side sill having a structure for supporting operations of opening and closing the sliding door is applied.

Figure 7:
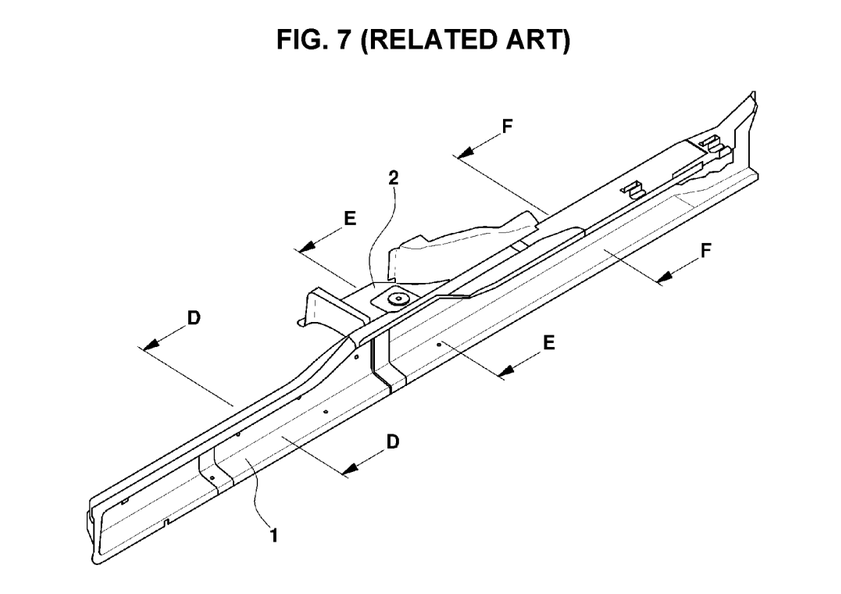
FIG. 7 (RELATED ART) is a perspective view of an inner panel of a conventional side sill.
Figure 8:
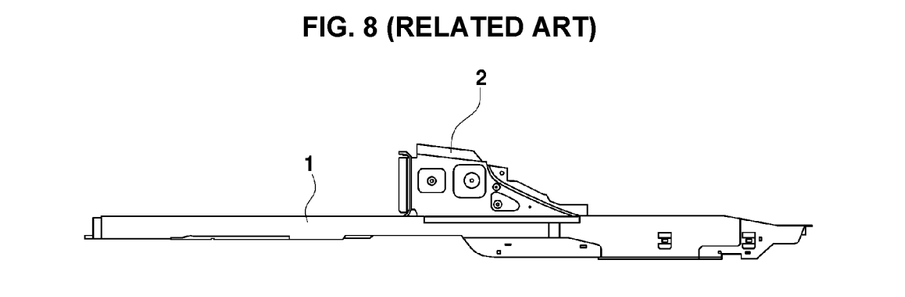
FIG. 8 (RELATED ART) is a top view of FIG. 7.
Figure 9:
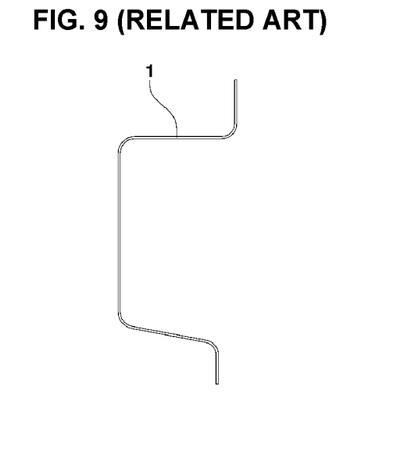
FIG. 9 (RELATED ART) is a cross-sectional view taken along line D-D of FIG. 7.
Figure 10:
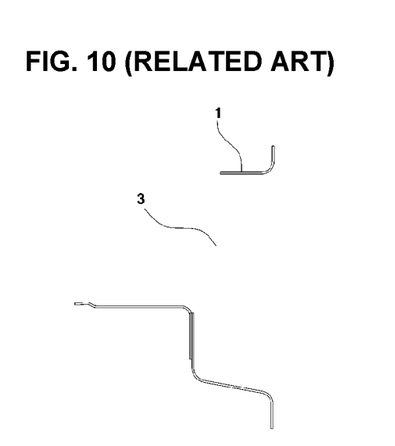
FIG. 10 (RELATED ART) is a cross-sectional view taken along line E-E of FIG. 7.
Figure 11:
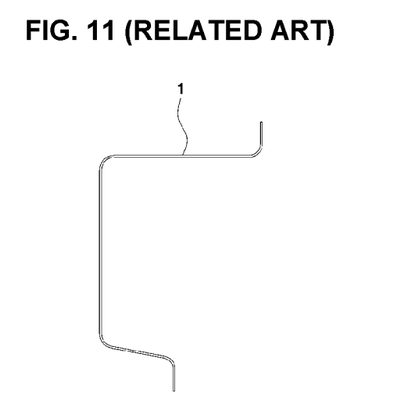
FIG. 11 (RELATED ART) is a cross-sectional view taken along line F-F of FIG. 7.

FIG. 7 (RELATED ART) is a perspective view of an inner panel of a conventional side sill, FIG. 8 (RELATED ART) is a top view of FIG. 7, FIG. 9 (RELATED ART) is a cross-sectional view taken along line D-D of FIG. 7, FIG. 10 (RELATED ART) is a cross-sectional view taken along line E-E of FIG. 7, and FIG. 11 (RELATED ART) is a cross-sectional view taken along line F-F of FIG. 7.

An inner panel 1 shown in FIGS. 7 to 10 constitutes a side sill of a vehicle, and more particularly, is the inner panel of the side sill in which a front door is opened and closed in a swinging manner and a rear door is opened and closed in a sliding manner.

The inner panel 1 is configured such that a door mounting part 2 for mounting a sliding door thereon is disposed on an outer surface of the inner panel 1, and the door mounting part 2 slides in forward and rearward directions using a door hinge mounted on an inner surface of the inner panel 1.

In order to achieve connection between the door mounting part and the door hinge and sliding movement of the door mounting part 2, a rectangular hole 3 is provided in the inner panel 1. A reinforcing bracket must be provided on the inner surface of the inner panel 1 so as to reinforce the inner panel 1 having the rectangular hole 3 provided therein.

Further, a central portion of the inner panel 1 in upward and downward directions is bent to protrude to the outside of the vehicle body so as to have a C-shaped cross-section. Therefore, in order to ensure a space in which the protruding door mounting part 2 mounted on the outer surface of the inner panel 1 and the sliding door mounted in the door mounting part 2 are disposed, an area of a space inside the vehicle is reduced compared to other vehicles having the same size.

The above information disclosed in this Background section is only for enhancement of understanding of the background of the invention and therefore it may contain information that does not form the prior art that is already known in this country to a person of ordinary skill in the art.

SUMMARY

The present disclosure provides a side sill for mounting a sliding door of a vehicle which may support operations of opening and closing the sliding door through a simplified structure without reducing an area of a space inside the vehicle.

In one aspect, the present disclosure provides a side sill for mounting a sliding door of a vehicle, including an inner panel formed to extend in forward and rearward directions and mounted at a side portion of a floor panel of a vehicle body, and an outer panel formed integrally with an upper end and a lower end of the inner panel so as to be disposed opposite the floor panel of the vehicle body based on the inner panel, the outer panel having a module mounting part configured to mount a sliding module for the sliding door thereon at a central portion of the outer panel based on upward and downward directions, the module mounting part being open towards an outside of the vehicle body.

In an embodiment, each of the inner panel and the outer panel may be configured to have a same cross-section in the forward and rearward directions.

In another embodiment, a central portion of the inner panel in the upward and downward directions may be bent to protrude towards an inside of the vehicle body so as to have a C-shaped cross-section.

In still another embodiment, a central portion of the module mounting part in the upward and downward directions may be bent to protrude towards the inner panel so as to have a C-shaped cross-section.

In yet another embodiment, a side flange configured to be bonded to the floor panel of the vehicle body may protrude from a central portion of the inner panel in the upward and downward directions.

In still yet another embodiment, a cross member configured to extend in leftward and rightward directions may be mounted on an upper surface of the floor panel of the vehicle body, and the cross member may be coupled to an upper portion of the inner panel by a connection bracket.

In a further embodiment, a battery case may be disposed under the floor panel of the vehicle body, and a mount panel disposed under the inner panel may be formed to protrude from a side portion of the battery case and to be coupled to a lower portion of the inner panel.

In another further embodiment, an insert nut may be assembled with the inner panel so as to penetrate the lower portion of the inner panel, and a bolt member may be assembled with the mount panel so as to penetrate the mount panel and is then coupled to the insert nut.

In still another further embodiment, an upper portion of the insert nut may penetrate the mount rib by press fitting, and the mount rib may be formed integrally with the inner panel and the outer panel so as to be disposed above the lower portion of the inner panel.

In yet another further embodiment, a space configured such that reinforcement ribs are disposed therein may be provided between the inner panel and the outer panel.

In still yet another further embodiment, the sliding module may be configured to support sliding movement of the sliding door so as to open and close the sliding door. The sliding module may include a rail mounted on the module mounting part, and a door coupler assembled with the rail so as to be slidable and configured such that the sliding door is coupled to the door coupler.

Other aspects and embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, which may be included within the spirit and scope of the disclosure as defined by the appended claims. Details illustrated in the accompanying drawings are provided merely to satisfactorily describe the embodiments of the present disclosure, and may be different from forms which are actually implemented.

Further, it is to be understood that directions, such as the forward and rearward directions, the upward and downward directions, the leftward and rightward directions, etc., will be defined based on a vehicle or a vehicle body.

Figure 1:
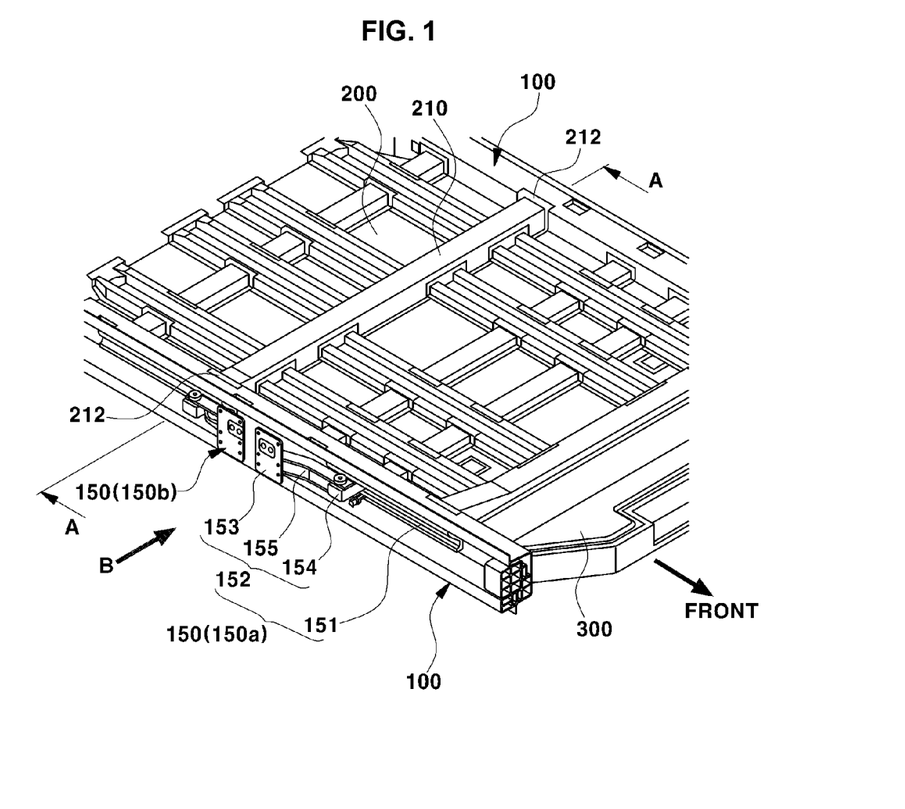
FIG. 1 is a perspective view illustrating a floor panel of a vehicle body on which a side sill according to one embodiment of the present disclosure is mounted.
Figure 2:
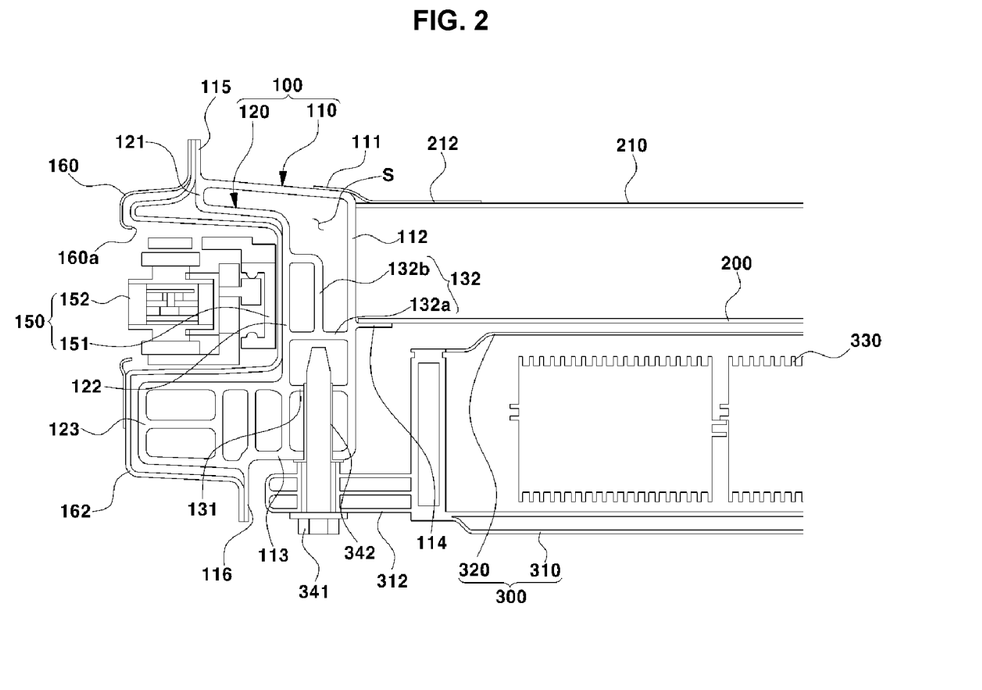
FIG. 2 is a cross-sectional view taken along line A-A of FIG. 1.
Figure 3:
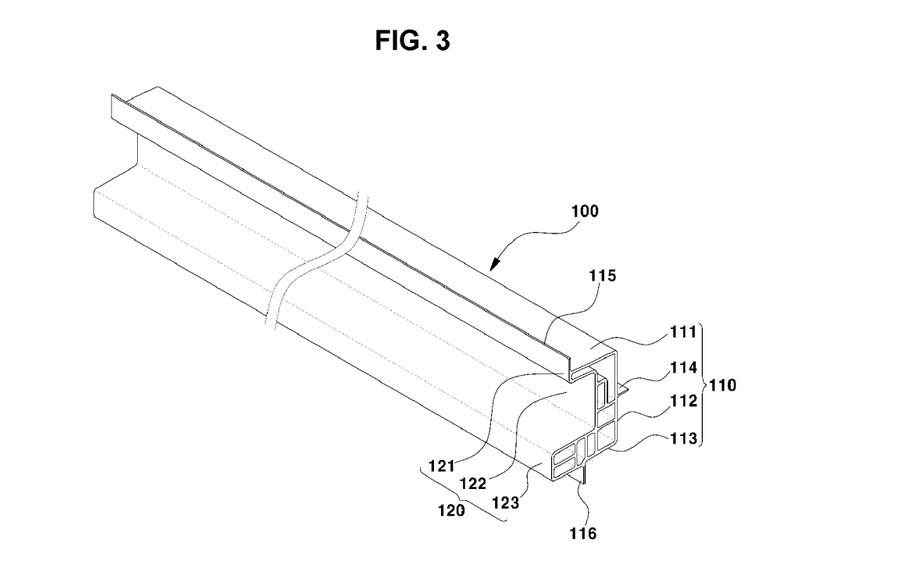
FIG. 3 is a perspective view illustrating the side sill according to one embodiment of the present disclosure.

FIG. 1 is a perspective view illustrating a floor panel of a vehicle body on which a side sill according to one embodiment of the present disclosure is mounted, FIG. 2 is a cross-sectional view taken along line A-A of FIG. 1, and FIG. 3 is a perspective view illustrating the side sill according to one embodiment of the present disclosure. In particular, reference numeral 100 indicates the side sill.

The side sill 100 is a side member of the vehicle body on which a sliding door is mounted, and as shown in FIGS. 1 and 2, a sliding module 150 configured to support sliding movement of the sliding door so as to open or close the sliding door is mounted on the side sill 100. That is, the sliding door of the vehicle is mounted on the side sill 100 through the sliding module 150 so as to be slidable. The sliding module 150 is a device which enables the sliding door to be slidably opened or closed, and may thus be referred to as a door opening and closing device.

As shown in FIGS. 2 and 3, the side sill 100 includes an inner panel 110 and an outer panel 120, and is formed in a single piece through extrusion molding. That is, the side sill 100 preferably is formed as a single part.

The side sill 100 may be formed through extrusion molding using a metal material, particularly aluminum. The side sill 100 may be coupled to each of both sides, i.e., left and right sides, of a cross member 210, and may be coupled to each of both sides of a floor panel 200 of the vehicle body.

The side sill 100 preferably is formed to have a same cross-section in the forward and rearward directions. That is, the side sill 100 extends such that the cross-sections of all positions of the side sill 100 in the forward and rearward directions have the same structure. Therefore, each of the inner panel 110 and the outer panel 120 of the side sill 100 has the same cross-section in the forward and rearward directions.

A central portion 112 of the inner panel 110 of the side sill 100 in the upward and downward directions is bent to protrude towards the inside of the vehicle body so as to have an approximately C-shaped cross-section.

In particular, an upper portion 111 and a lower portion 113 of the inner panel 110 of the side sill 100 based on the central portion 1112 of the inner panel 110 are bent towards the outside of the vehicle body, and in this case, the central portion 112 stands up in the upward and downward directions and the upper portion 111 and the lower portion 113 lie down in the leftward and rightward directions.

The inner panel 110 of the side sill 100 is configured such that the above-described C-shaped cross-sectional structure extends in the forward and rearward directions.

The inner panel 110 of the side sill 100 is mounted at each of sides of the floor panel 200 of the vehicle body in the leftward and rightward directions. Referring to FIG. 1, the side sill 100 is disposed to be mounted at each of the left and right sides of the floor panel 200 of the vehicle body.

The floor panel 200 is a panel disposed under the vehicle body, and thus may be referred to as a lower panel. The floor panel 200 may be formed of a metal material, and may be manufactured by press forming.

A side flange 114 may be provided at the central portion 112 of the inner panel 110 of the side sill 100. The side flange 114 may be formed on the inner surface of the central portion 112 so as to protrude towards the inside of the vehicle body, and may extend horizontally in the leftward and rightward directions. The inner surface of the central portion 112 is the surface of the central portion 112 that faces the inside of the vehicle body based on the leftward and rearward directions of the vehicle.

The side flange 114 may be coupled to one side portion of the floor panel 200 of the vehicle body by bonding. The side portion of the floor panel 200 of the vehicle body may be coupled to the side flange 114 in the state in which the side portion of the floor panel 200 is stacked on the side flange 114.

Further, an upper flange 115 and a lower flange 116 may be formed integrally with the upper end and the lower end of the inner panel 110 of the side sill 100, respectively. The upper flange 115 may be formed to extend vertically upwards from the upper end of the inner panel 110, and the lower flange 116 may be formed to extend vertically downwards from the lower end of the inner panel 110.

The upper end of the inner panel 110 of the side sill 100 is the upper end of the upper portion 111 of the inner panel 110, which is disposed opposite the lower portion 113 based on the central portion 112 of the inner panel 110. The lower end of the inner panel 110 of the side sill 100 is the lower end of the lower portion 113 of the inner panel 110, which is disposed opposite the upper portion 111 based on the central portion 112 of the inner panel 110.

As shown in FIGS. 2 and 3, the outer panel 120 of the side sill 100 is disposed to be spaced outwards apart from the inner panel 110 of the side sill 100 by a designated interval in the leftward and rightward directions. That is, the outer panel 120 of the side sill 100 is disposed opposite the floor panel 200 of the vehicle body based on the inner panel 110.

The outer panel 120 is formed integrally with the upper end and the lower end of the inner panel 110, and extends in the forward and rearward directions correspondingly to the inner panel 110. The interval between the inner panel 110 and the outer panel 120 may vary depending on positions thereof in the upward and downward directions.

A central portion 122 of the outer panel 120 forms a module mounting part 122. That is, the central portion 122 of the outer panel 120 serves as the module mounding part 122. That is, the outer panel 120 includes the module mounting part 122.

An upper portion 121 of the outer panel 120 may extend integrally from the upper end of the module mounting part 122 and the upper end of the inner panel 110, and may be disposed to extend vertically upwards from the upper end of the module mounting part 122 and then to be connected to the upper end of the inner panel 110.

A lower portion 123 of the outer panel 120 may extend integrally from the lower end of the module mounting part 122 and the lower end of the inner panel 110, and may be disposed to extend vertically downwards from the lower end of the module mounting part 122, to be bent towards the inner panel 110 and then to be connected to the lower end of the inner panel 110.

The module mounting part 122 is bent to have an approximately C-shaped cross-section, and more particularly, is bent such that the central portion of the module mounting part 122 in the upward and downward directions protrudes towards the inner panel 110. Therefore, the module mounting part 122 may be formed to surround a space in which the sliding module 150 is disposed. Thus, the sliding module 150 may be inserted into the module mounting part 122 so as to be mounted in the module mounting part 122.

The module mounting part 122 may be formed to have a C-shaped cross-section which is open towards the outside of the vehicle. That is, a region of the space surrounded by the module mounting part 122 opposite the inner panel 110 is open.

Therefore, the sliding module 150 may be configured to have a simplified structure for supporting sliding movement of the sliding door, compared to the structure of a conventional sliding module.

As shown in FIGS. 1 and 2, the cross member 210 configured to extend in the leftward and rightward directions is mounted on the upper surface of the floor panel 200 of the vehicle body.

The cross member 210 may be disposed at the central portion of the floor panel 200 in the forward and rearward directions, and may be coupled to the upper portions 111 of the inner panels 110 of the respective side sills 100 by connection brackets 212.

The connection bracket 212 may be bonded to the upper surface of the inner panel 110 and the upper surface of the cross member 210 in the state in which the connection bracket 212 is stacked on the upper surface of the inner panel 110 and the upper surface of the cross member 210. The left and right ends of the cross member 210 may be disposed adjacent to the central portions 112 of the respective inner panels 110.

The upper surface of the inner panel 110 is the upper surface of the upper portion 111 of the inner panel 110.

Further, a battery case 300 having a plurality of battery modules 330 provided therein may be disposed under the floor panel 200 of the vehicle body. The battery modules 330 are used as a power source of the vehicle.

The battery modules 330 are collected in a pack type and thus form a battery pack, and therefore, reference numeral 330 may be referred to as a battery pack or a battery. In particular, a battery pack 330 including a plurality of battery modules may be mounted in the battery case 300. Further, the battery case 300 may be referred to as a battery housing.

The battery case 300 may include an upper case 320 and a lower case 310. The lower case 310 may be formed in a box structure having an open upper end, and the upper case 320 may be separably coupled to the upper end of the lower case 310.

Further, a mount panel 312 may be provided at each of side portions of the lower case 310 in the leftward and rightward directions. That is, the mount panel 312 may be provided at each of side portions of the battery case 200 in the leftward and rightward directions.

The mount panel 312 is provided at the side portion of the battery case 300 so as to couple the battery case 300 to the side sill 100, and may thus be referred to as a battery bracket. The mount panel 312 may couple the battery case 300 to the side sill 100 in the state in which the battery case 300 is spaced apart from the side sill 100.

The mount panel 312 may be formed integrally with the side portion of the lower case 312, and may protrude from the side portion of the lower case 312 towards the outside of the vehicle.

That is, the mount panel 312 may be formed to protrude from the side portion of the lower case 310 towards the inner panel 310, and may extend horizontally from the side portion of the lower case 310.

The mount panel 312 may be formed at the side portion of the battery case 300 so as to extend along the side portion of the battery case 300 in the forward and rearward directions. The mount panel 312 may be formed integrally with the battery case 300 when the battery case 300 is formed through extrusion molding.

Further, the mount panel 312 may be disposed under the lower portion 113 of the inner panel 110, and may be coupled to the inner panel 110 by a bolt member 341.

The mount panel 312 may be coupled to the lower portion 113 of the inner panel 110 by the bolt member 341. An insert nut 342 coupled to the bolt member 341 may be provided at the lower portion 113 of the inner panel 110.

The insert nut 342 may be assembled with the inner panel 110 so as to penetrate the lower portion 113 of the inner panel 110, and the bolt member 341 may be assembled with the mount panel 312 so as to penetrate the mount panel 312 and then be coupled to the insert nut 342.

Further, the insert nut 342 may be assembled with the inner panel 110 such that the upper portion of the insert nut 342 is engaged with a mount rib 131 provided in the inner space of the side sill 100 by press fitting. The insert nut 342 may be formed to extend in the upward and downward directions so that the upper portion of the insert nut 342 penetrates the mount rib 131 by press fitting, and the lower portion of the insert nut 342 penetrates the lower portion 113 of the inner panel 110 by press fitting.

The mount rib 131 is formed integrally with the inner panel 110 and the outer panel 120 inside the side sill 100 (i.e., in a space S within the side sill 100), and is disposed above the lower portion 113 of the inner panel 110. In particular, the mount rib 131 may be disposed in the space S provided between the inner panel 110 and the outer panel 120.

Further, reinforcement ribs 132 configured to increase the stiffness of the side sill 100 may be disposed in the space S.

The reinforcement ribs 132 may include at least one first reinforcement rib 132a and at least one second reinforcement rib 132b.

The first reinforcement rib 132a may be formed to extend integrally from the inner panel 110 to the outer panel 110. The second reinforcement rib 132b may be formed to extend integrally from the outer panel 120 to the first reinforcement rib 132a.

Referring to FIG. 2, a side outer reinforcement 162 may be disposed outside the outer panel 120 of the side sill 100, and a side outer panel 160 may be disposed outside the side outer reinforcement 162.

The side outer panel 160 is a member that constitutes a side panel of the vehicle body, and the side outer reinforcement 162 is a member that reinforces the stiffness of the side outer panel 160. The side panel may include the side outer panel 160 and a side inner panel (not shown).

The side outer reinforcement 162 may be configured such that the upper portion thereof is bonded to the upper flange 115 of the side sill 100 and the lower portion thereof is bonded to the lower flange 116 of the side sill 100, and may have a cross-section corresponding to the outer panel 120 of the side sill 100.

The central portion of the side outer reinforcement 162 may be bonded to the module mounting part 122 of the outer panel 120. Therefore, the sliding module 150 may be mounted in the module mounting part 122 in the state in which the sliding module 150 is bonded to the central portion of the side outer reinforcement 162.

Further, the side outer reinforcement 162 may be formed such that the upper portion thereof protrudes farther outside the vehicle body than the outer panel 120, and the upper portion of the side outer reinforcement 162 may protrude to the outside of the vehicle body due to the width of the sliding module 150 in the leftward and rightward directions.

The side outer panel 160 has an opening 160a so as to open a space surrounded by the module mounting part 122 and the side outer reinforcement 162.

That is, the side outer panel 160 has the opening 160a so as to open the space inside the side sill 100 in which the sliding module 150 is mounted. The opening 160a is formed in the side outer panel 160 so as to extend in the forward and rearward directions.

Figure 4:
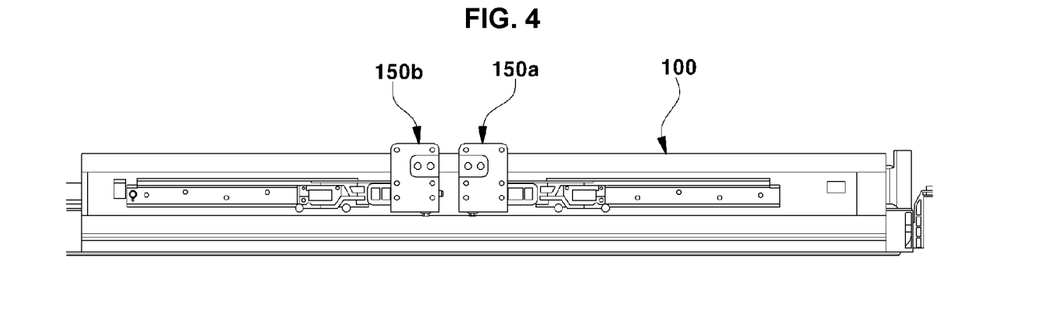
FIG. 4 is a view of FIG. 1, as seen from direction B.
Figure 5:
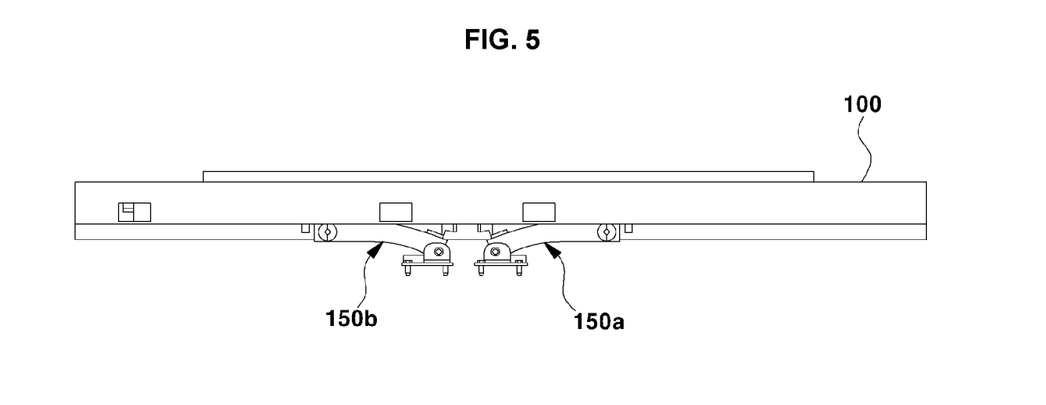
FIG. 5 is a top view of a sliding module shown in FIG. 4.
Figure 6:
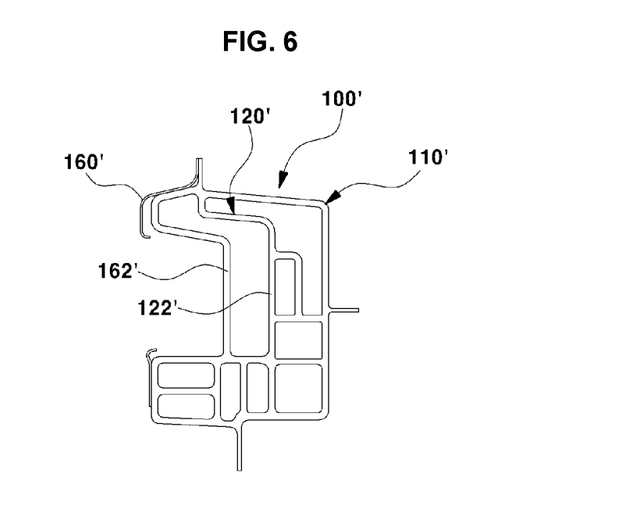
FIG. 6 is a cross-sectional view illustrating a side sill according to another embodiment of the present disclosure.

FIG. 4 is a view of FIG. 1, as seen from direction B, FIG. 5 is a top view of the sliding module shown in FIG. 4, and FIG. 6 is a cross-sectional view illustrating a side sill according to another embodiment of the present disclosure.

First, referring to FIG. 6, a side outer reinforcement 162' may be formed integrally with a side sill 100'. The side outer reinforcement 162' may be formed such that the upper portion thereof extends integrally from the upper end of an inner panel 110' of the side sill 100' and the upper end of an outer panel 120' of the side sill 100', and the lower portion thereof extends integrally from the lower portion of a module mounting part 122'.

The upper portion of the side outer reinforcement 162' may be bent to protrude towards the outside of a vehicle body, and the lower portion of the side outer reinforcement 162' may be formed to extend vertically in the upward and downward directions.

Referring to FIGS. 4 and 5, a front sliding module 150a configured to support sliding movement of a front door and a rear sliding module 150b configured to support sliding movement of a rear door are disposed in the forward and rearward directions.

In the case of a vehicle in which both a front door and a rear door are slidably moved to be opened and closed, the front sliding module 150*a* and the rear sliding module 150*b* may be mounted on the side sill 100. The front sliding module 150*a* and the rear sliding module 150*b* may be configured to have the same operation structure, and may be symmetrical with each other based on the forward and rearward directions.

The side sill 100 having the above-described configuration is formed to have the same cross-section in the forward and rearward directions, and thus both the front sliding module 150*a* and the rear sliding module 150*b* may be mounted on the side sill 100. The side sill 100 may be disposed under both the front door and the rear door.

Referring to FIGS. 1, 2 and 4, the sliding module 150 may include a rail 151 mounted on the module mounting part 122 of the outer panel 120, and a door coupler 152 assembled with the rail 151 so as to be slidable.

The rail 151 may be formed to extend in the forward and rearward directions, and may be mounted at the central portion of the side outer reinforcement 162 disposed in the module mounting part 122.

The door coupler 152 may include a door mounting part 153 in which a sliding door is mounted so as to be coupled thereto, and a sliding block 154 slidably mounted on the rail 151.

The door mounting part 153 is rotatably coupled to the sliding block 154 by a hinge arm 155, and the hinge arm 155 is rotatably coupled to the sliding block 154 and the door mounting part 153 by respective hinges.

The sliding door coupled to the door mounting part 153 may slide along the rail 151 so as to be opened or closed in the state in which the sliding door swings to the outside of the vehicle body about the hinge arm 155.

The sliding module 150 may be configured to be operated by driving a motor, and may slide the sliding door located at the side of the vehicle in the forward and rearward directions due to driving of the motor so as to open and close the sliding door. The motor may receive power supplied from a battery provided in the vehicle, and the battery may be the battery pack 330 or an auxiliary battery configured to supply power to operate an electric field load of the vehicle.

As is apparent from the above description, a side sill for mounting a sliding door of a vehicle according to the present disclosure provides the following effects.

First, the side sill according to the present disclosure is formed in a single piece having a simple structure, thereby being capable of promoting weight and cost reduction and simplification of the structure of a vehicle body.

Second, the side sill according to the present disclosure enables a space for mounting a sliding module therein to be located outside the vehicle body, thereby being capable of securing a space for disposition of the sliding door without reducing the area of a space inside the vehicle.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. A side sill for mounting a sliding door of a vehicle, comprising:
   an inner panel formed to extend in forward and rearward directions and mounted at a side portion of a floor panel of a vehicle body; and
   an outer panel formed integrally with an upper end and a lower end of the inner panel so as to be disposed opposite the floor panel of the vehicle body based on the inner panel, the outer panel having a module mounting part configured to mount a sliding module for the sliding door thereon at a central portion of the outer panel based on upward and downward directions, the module mounting part being open towards an outside of the vehicle body,
   wherein an upper flange is formed integrally with the upper end of the inner panel of the side sill, a lower flange is formed integrally with the lower end of the inner panel of the side sill, the upper flange is formed to extend upwards from the upper end of the inner panel, and the lower flange is formed to extend downwards from the lower end of the inner panel,
   wherein the upper flange and the lower flange are disposed such that the sliding module is sandwiched between the upper flange and the lower flange based on the upward and downward directions, and
   wherein a central portion of the inner panel in the upward and downward directions is bent to protrude towards an inside of the vehicle body so as to have a C-shaped cross-section.

2. The side sill of claim 1, wherein each of the inner panel and the outer panel is configured to have a same cross-section in the forward and rearward directions.

3. The side sill of claim 1, wherein the sliding module is configured to support sliding movement of the sliding door so as to open and close the sliding door.

4. The side sill of claim 1, wherein a central portion of the module mounting part in the upward and downward directions is bent to protrude towards the inner panel so as to have a C-shaped cross-section.

5. The side sill of claim 1, wherein a side flange configured to be bonded to the floor panel of the vehicle body protrudes from the central portion of the inner panel in the upward and downward directions.

6. The side sill of claim 1, wherein a cross member configured to extend in leftward and rightward directions is mounted on an upper surface of the floor panel of the vehicle body, and the cross member is coupled to an upper portion of the inner panel by a connection bracket.

7. The side sill of claim 6, wherein a battery case is disposed under the floor panel of the vehicle body, and a mount panel disposed under the inner panel is formed to protrude from a side portion of the battery case and to be coupled to a lower portion of the inner panel.

8. The side sill of claim 7, wherein an insert nut is assembled with the inner panel so as to penetrate the lower portion of the inner panel, and a bolt member is assembled with the mount panel so as to penetrate the mount panel and is then coupled to the insert nut.

9. The side sill of claim 8, wherein an upper portion of the insert nut penetrates a mount rib by press fitting, and the mount rib is formed integrally with the inner panel and the outer panel so as to be disposed above the lower portion of the inner panel.

10. The side sill of claim 1, wherein a space configured such that reinforcement ribs are disposed therein is provided between the inner panel and the outer panel.

11. The side sill of claim 3, wherein the sliding module comprises:
   a rail mounted on the module mounting part; and
   a door coupler assembled with the rail so as to be slidable and configured such that the sliding door is coupled to the door coupler.

12. The side sill of claim 1, wherein the side sill includes the inner panel and the outer panel, and is formed in a single piece through extrusion molding such that the side sill is formed as a single part.

13. The side sill of claim 10, wherein the reinforcement ribs include a first reinforcement rib, and the first reinforcement rib is formed to extend integrally from the inner panel to the outer panel.

14. The side sill of claim 13, wherein the first reinforcement rib overlaps with a battery in a battery case based on a horizontal direction.

15. The side sill of claim 1, wherein a side outer reinforcement is disposed outside the outer panel of the side sill, the side outer reinforcement is configured such that an upper portion of the side outer reinforcement is bonded to the upper flange and a lower portion of the side outer reinforcement is bonded to the lower flange, and the side outer reinforcement has a cross-section corresponding to the outer panel such that a central portion of the side outer reinforcement is bonded to the module mounting part of the outer panel, and wherein the sliding module is mounted in the module mounting part in a state in which the sliding module is bonded to the central portion of the side outer reinforcement.

\* \* \* \* \*